(12) United States Patent
Baldwin et al.

(10) Patent No.: US 6,778,734 B2
(45) Date of Patent: Aug. 17, 2004

(54) THERMALLY TUNABLE FIBER DEVICES WITH MICROCAPILLARY HEATERS

(75) Inventors: Kirk William Baldwin, Springfield, NJ (US); Benjamin John Eggleton, Summit, NJ (US); Kenneth Stephen Feder, Murray Hill, NJ (US); Robert A. Macharrie, Easton, PA (US); John A. Rogers, New Providence, NJ (US); Paul Steinvurzel, Jersey City, NJ (US); Jon Engelberth, Denville, NJ (US); Rajan Deshmukh, Trenton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/047,339

(22) Filed: Jan. 15, 2002

(65) Prior Publication Data

US 2003/0133656 A1 Jul. 17, 2003

(51) Int. Cl.⁷ .................................................. G02B 6/34
(52) U.S. Cl. ........................................................ 385/37
(58) Field of Search .................................... 385/37, 123

(56) References Cited

U.S. PATENT DOCUMENTS

| | | | | |
|---|---|---|---|---|
| 5,987,200 A | * | 11/1999 | Fleming et al. | 385/37 |
| 6,215,922 B1 | * | 4/2001 | Okayama | 385/24 |
| 6,275,629 B1 | * | 8/2001 | Eggleton et al. | 385/37 |
| 6,411,746 B1 | * | 6/2002 | Chamberlain et al. | 385/2 |

FOREIGN PATENT DOCUMENTS

| | | | | |
|---|---|---|---|---|
| EP | 0997764 A1 | | 5/2000 | G02F/1/01 |
| EP | 1139149 A2 | | 10/2001 | G02F/1/01 |
| JP | 10-221658 A | * | 8/1998 | 385/37 |
| WO | WO 01/53880 A1 | | 7/2001 | G05D/23/24 |

OTHER PUBLICATIONS

Rogers, J. A. et al., "Characteristics of Heat Flow In Optical Fiber Devices That Use Integrated Thin–Film Heaters" Applied Optics, Optical Society Of America, Washington, US, vol. 39, No. 28, Oct. 1, 2000, pp. 5109–5116.

* cited by examiner

Primary Examiner—John D. Lee
Assistant Examiner—Mike Stahl (57) ABSTRACT

A thermally tunable optical fiber device comprises a length of optical fiber including a device disposed within a microcapillary heater. The microcapillary heater can include a thin film resistive heater. The fiber itself can optionally include a thin film resistive heater overlying the device, and a plurality of nested microcapillary tubes can optionally provide a plurality of successive concentric heaters overlying the device. The heaters films can be films with uniform, tapered or periodically varying thickness. The heaters can be single layer or multiple layer. Multiple layer films can be superimposed with intervening insulating layers or plural layers can be formed on different angular regions of the microcapillary. Thus one can provide virtually any desired temperature versus length profile along the fiber device.

5 Claims, 8 Drawing Sheets

THERMALLY TUNABLE FIBER DEVICES WITH MICROCAPILLARY HEATERS

FIELD OF THE INVENTION

This invention relates to thermally tunable fiber devices and, in particular, to thermally tunable devices disposed within microcapillary heaters.

BACKGROUND OF THE INVENTION

Optical fibers include within their structures a variety of devices highly important for the proper operation of systems employing the fibers. Such devices, designed to process entering light include optical gratings and lengths of specialized fiber such as dispersion compensating fiber and rare earth doped amplifying fiber. In many applications it is desirable to tune selected characteristics of the fiber devices. Tuning by the application of heat is particularly convenient, especially for fiber grating devices.

Optical fiber gratings are important elements for selectively controlling specific wavelengths of light within optical systems. An optical grating typically comprises a body of material and a plurality of substantially equally spaced optical grating elements such as index perturbations, slits or grooves. Such gratings include Bragg gratings and long period gratings. The ability to dynamically modify these gratings would be highly useful.

A typical Bragg grating comprises a length of optical waveguide, such as optical fiber, including a plurality of perturbations in the index of refraction. These perturbations selectively reflect light of wavelength $\lambda$ equal to twice the spacing $\Lambda$ between successive perturbations times the effective refractive index, i.e. $\lambda=2n_{eff}\Lambda$, where $\lambda$ is the vacuum wavelength and $n_{eff}$ is the effective reactive index of the propagating mode. The remaining wavelengths pass essentially unimpeded. Bragg gratings have found use in a variety of applications including filtering, adding and dropping signal channels, stabilization of semiconductor lasers, reflection of fiber amplifier pump energy, and compensation for waveguide dispersion.

A long period grating couples optical power between two copropagating modes with very low back reflections. It typically comprises a length of optical waveguide wherein the refractive index perturbations are spaced by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range 1/5 $\Lambda'$ to 4/5 $\Lambda'$. In some applications, such as chirped gratings, the spacing $\Lambda'$ can vary along the length of the grating.

Long-period gratings are particularly useful in optical communication systems for equalizing amplifier gain at different wavelengths. See, for example, U.S. Pat. No. 5,430,817 issued to A. M. Vengsarkar on Jul. 4, 1995.

Many potential applications require optical gratings having characteristics which are tunable. Tunable Bragg gratings can permit dynamic control of which wavelength will pass through the grating and which will be reflected or diverted. A tunable chirped Bragg grating can permit dynamic dispersion compensation. And a tunable long period grating can provide dynamic gain compensation.

Thermally tunable grating devices control the characteristics of the gratings by the application of heat to change the index of refraction and thus the optical pathlength between successive perturbations. An emerging class of tunable fiber devices uses conventional intracore fiber gratings and thin film resistive heaters with uniform, tapered or periodically varying thicknesses formed in single or multilayer geometries on the fiber surface. Current passing through these films causes distributed Joule heating at rates that depend on the electrical current and the local resistance of the coating. The temperature changes induced by this heating alter the properties of gratings in the core of the fiber. Uniform heating of a fiber Bragg grating, for example, causes a shift in the resonance wavelength proportional to the change in temperature. The shift is due primarily to the intrinsic dependence of the glass index of refraction on temperature. Fiber elongation caused by the thermal expansion also induces smaller shifts.

By using microfabricated distributed heaters with resistances that vary along the length of the fiber grating (typically 2–10 cm long), it is possible to induce and dynamically adjust simple or complex spatial variations in the periodicity of the grating (i.e. chirps). Integrated heaters with thicknesses that depend inversely on position along the fiber have resistances that vary linearly with position. Heating produced by these films provides, to a good approximation, a tunable linear chirp. In reflection mode, Bragg gratings with this design can be used for dynamic per-channel dispersion compensation in high bit-rate lightwave communication systems. These devices are compact, power efficient, cost-effective and simple to build.

In many existing and future applications, it will be necessary to establish and control independently linear and higher order chirps, and to adjust the center position of the reflection band. This functionality can be realized with multiple independent heaters that produce temperature gradients with different functional forms. These heaters are designed with geometries that provide a "basis set" for defining and tuning the desired range of temperatures profiles. We previously demonstrated this approach in a simple system that incorporated one uniform and one tapered heater deposited in a multilayer geometry on the fiber surface. The metal heaters in this case were electrically insulated from one another by a thin film of $SiO_2$ deposited by plasma enhanced chemical vapor deposition. Coordinated control of the heaters allowed, for example, the chirp rate to be adjusted without shifting the center position.

While this multilayer geometry achieves the necessary functionality, it requires the deposition of multiple robust, thin layers on a highly curved object. It can be challenging to reliably produce these coatings from materials that are compatible with the relatively high operating temperatures (e.g. 300° C. of these devices) without expensive deposition tools. Also, these designs require multiple processing steps.

Accordingly, there is a need for alternative heater designs that avoid multiple depositions on highly curved fibers but, at the same time, retain all of the advantages of the multilayer thin film devices.

SUMMARY OF THE INVENTION

A thermally tunable optical fiber device comprises a length of optical fiber including a device disposed within a microcapillary heater. The microcapillary heater can include a thin film resistive heater. The fiber itself can optionally include a thin film resistive heater overlying the device, and a plurality of nested microcapillary tubes can optionally provide a plurality of successive concentric heaters overlying the device. The heaters films can be films with uniform, tapered or periodically varying thickness. The heaters can be single layer or multiple layer. Multiple layer films can be superimposed with intervening insulating layers or plural layers can be formed on different angular regions of the microcapillary. Thus one can provide virtually any desired temperature versus length profile along the fiber device.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are to illustrate the concepts of the invention and, except for the graphs, are not to scale.

DETAILED DESCRIPTION

Figure 1:
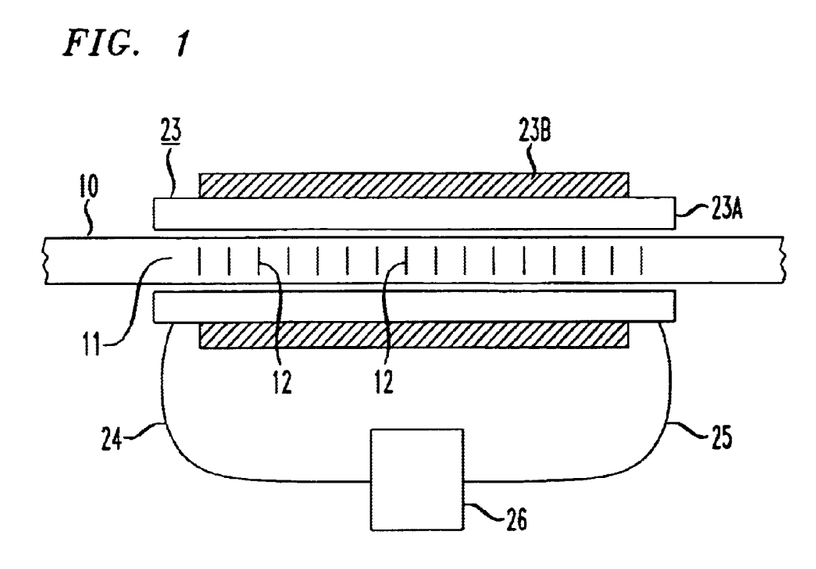
FIG. 1 is a schematic cross section of a tunable fiber device within a microcapillary heater.

Referring to the drawings, FIG. 1 illustrates an exemplary thermally tunable fiber device 9 comprising a length of optical fiber 10 including a fiber device 11 (here an optical grating composed of a sequence of index perturbations 12). The device 11 is disposed within an electrically controllable microcapillary heater 23 typically comprising a microcapillary tube 23A and a resistive film heater 23B on the outer surface of the tube overlying the device. By microcapillary tube is meant a tube having a maximum effective outer diameter of less than about 2 mm. (The effective diameter of a noncircular microcapillary is the diameter of a circle of comparable area.) Such a tube is advantageous because its small surface area presents low loss of heat for efficient heating and its small thermal mass permits fast response. The film heater 23B can have a uniform resistance along the length of the grating or, alternatively, a local resistance which varies along the length of the grating. The local resistance can be varied by varying its thickness or composition. Leads 24 and 25 can provide electrical contact with a power source 26 for passing current through the film heater 23B along the length of the grating.

The microcapillary is typically an electrically non-conducting material such as glass or a temperature resistant polymer such as a polymide. It can, however, be a resistive material, and a resistive microcapillary can be connected to a power supply to use the resistive material of the microcapillary as a heater. The microcapillary is typically circular in cross section, but noncircular cross sections such as square or rectangular tubes can also be used. Typical microcapillaries are rigid. But flexible polymer microcapillaries can be used and are more resistant to breakage.

The optical fiber device 11 is illustrated herein as an optical grating. It can, however, be any optical fiber device whose pertinent characteristics vary as function of temperature. It can, for example, be a length of specialty fiber such as dispersion compensating fiber or rare earth doped fiber.

Figure 2:
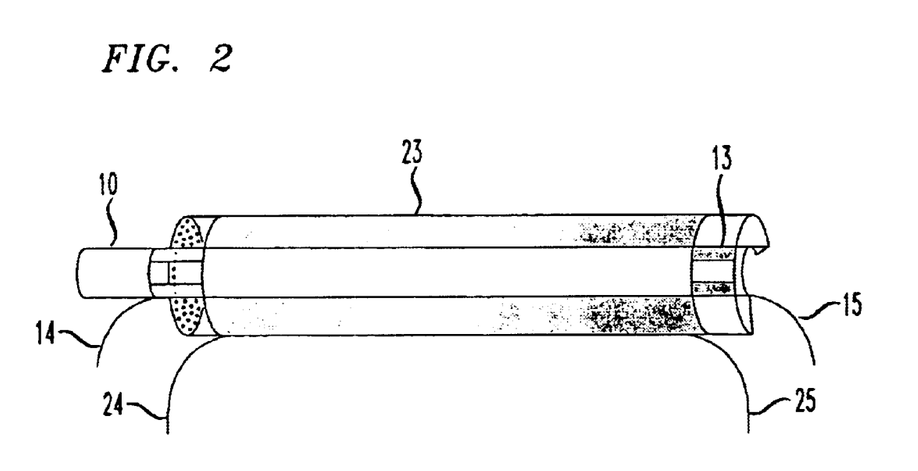
FIG. 2 illustrates a second embodiment of a tunable fiber device using a microcapillary heater and including a thin film heater on the grating.

FIG. 2 shows an alternative embodiment similar to that of FIG. 1 except that the fiber 10 also includes a resistive film heater 13 on the outer surface. The film 13 can have a uniform resistance along the length of the grating or a resistance which varies along the length of the grating. Leads 14 and 15 provide electrical contact with a power source (not shown) for passing current through film 13.

Figure 3:
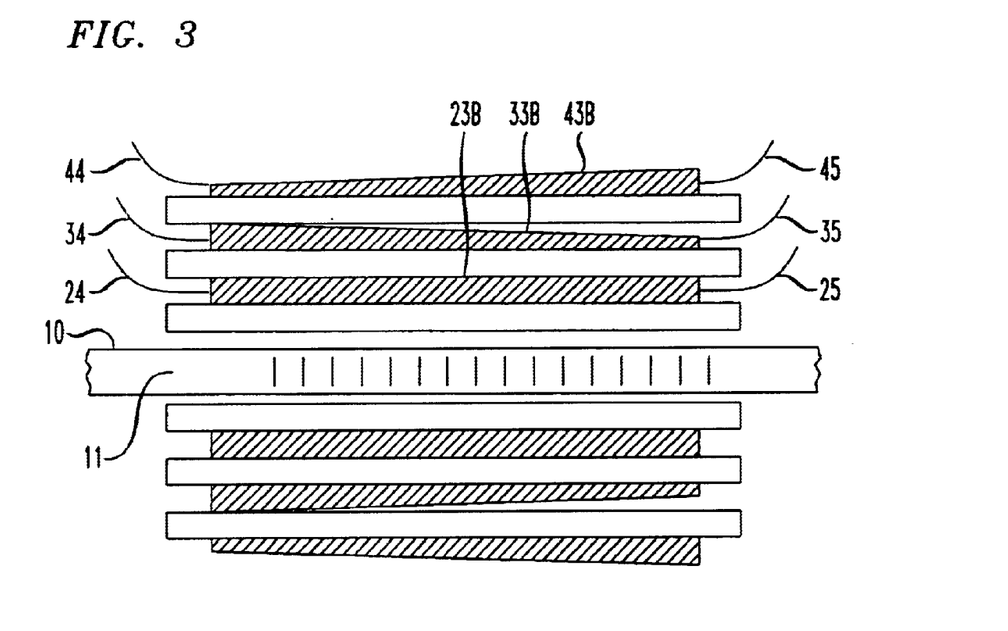
FIG. 3 is a schematic cross section of a third embodiment of a tunable fiber device using a microcapillary heater and including a plurality of nested thin film heaters.

FIG. 3 illustrates a third embodiment similar to that of FIG. 1 except that there are a plurality (here three) of nested microcapillary heaters 23B, 33B and 43B. Each of the heaters can have the same or different resistive profiles along the grating length. Advantageously, the resistive profiles are chosen to form a set which can produce desired temperature profiles along the device 11. For example, heater 23B can have a uniform resistance along its length, heater 33B can have a monotonically increasing resistance, and heater 43B can have a periodic or decreasing resistance profile. Control of respective power sources for each heater (not shown) permits establishment of a wide variety of temperature profiles along the grating 11.

Figure 4:
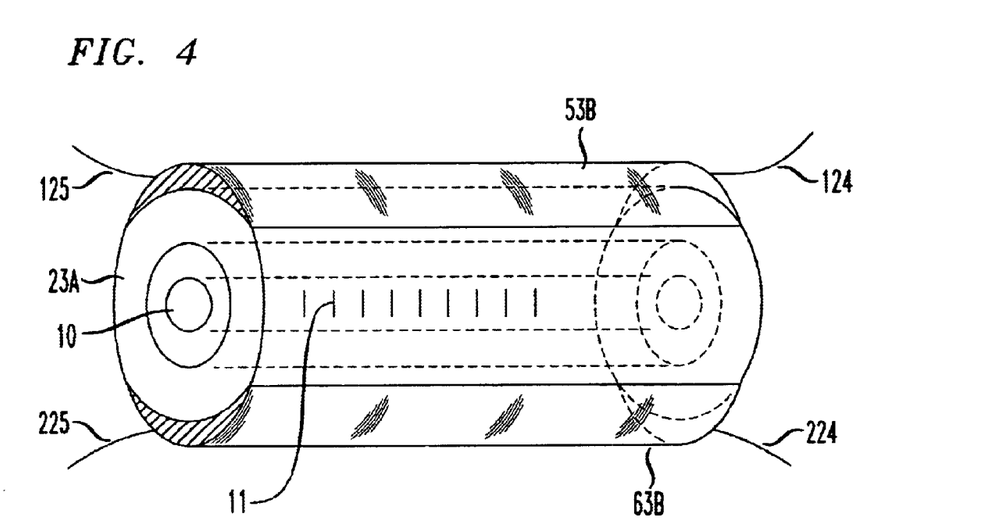
FIG. 4 illustrates yet a fourth embodiment of a tunable fiber device using a microcapillary heater including a plurality of angularly spaced apart thin film heaters.

FIG. 4 illustrates yet a fourth embodiment similar to FIG. 1 except that there are a plurality (here two) of microcapillary film heaters 53B and 63B angularly spaced apart. Each of the heaters 53B, 63B can extend along the length of the grating, although one or more need not be coextensive with the device 11. The heaters can be uniform in thickness or vary in thickness along the length. They can have the same thickness profile with distance or different thickness profiles. Leads 124, 125 and 224, 225 provide electrical contact to discrete power sources.

The invention can now be more clearly understood by consideration of the following specific examples.

EXAMPLE

A. General Design, Microcapillary Tubes and Tools for Threading

Devices were constructed using conventional in-fiber gratings, thin metal films and glass microcapillary tubes. In all cases, the gratings had intrinsic linear chirp and were written into standard telecommunications fiber (Lucent 5D fiber) using holographically generated phase masks and conventional procedures. To ensure stable operation of these gratings at temperatures up to ~150° C., the gratings were annealed at 400° C. for 20 s. One device was a $\mu$capillary device similar to that illustrated in FIG. 2. In this case metal film heaters were formed on the fiber and the outer surface of the capillary. The characteristics of the films are described below. Microcapillaries with inner diameters (IDs) of 140 $\mu$m were chosen because they provide a good fit with standard, unjacketed single mode 5D optical fiber (125 $\mu$m diameter). Microcapillaries with IDs of 280 $\mu$m were also used because of their good fit with jacketed fibers.

Figure 5A:
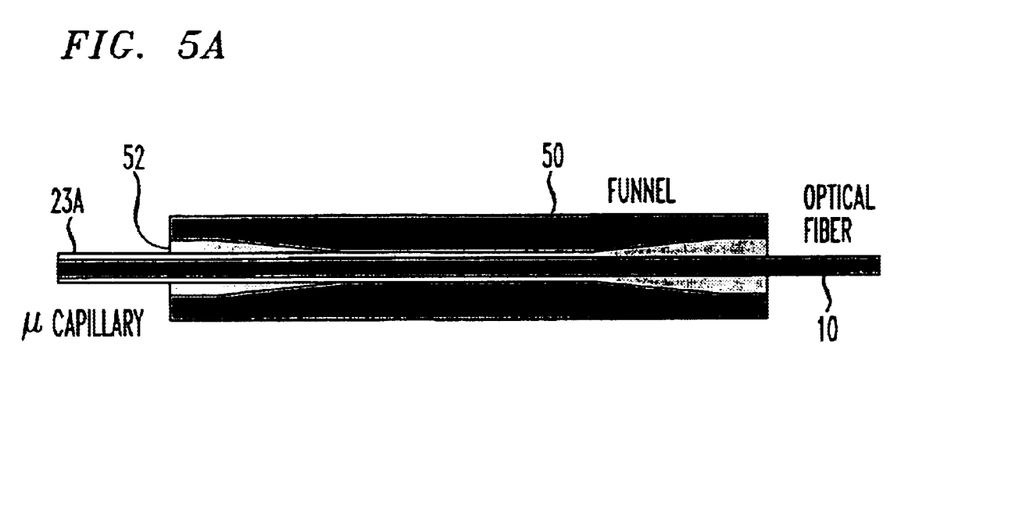
FIG. 5A schematically illustrates a glass funnel useful in threading fiber devices into microcapillaries.

As obtained from the manufacturer, the microcapillaries have thin polyimide coatings (10–20 µm thick) on their outer surfaces. We began by burning these coatings off with a butane flame. We rinsed the stripped capillaries with methanol and cleaved them into pieces ~15 cm long. Procedures described below were then used to form the thin metal film heaters. Optical fiber (with or without a polymer jacket) was threaded into the metal-coated capillaries using a simple glass funnel depicted in FIG. 5A. This funnel 50 is a cylindrical piece of glass with a center, axial air hole 52 whose diameter varies continuously and symmetrically from a relatively large value (~2 mm) at the ends to a relatively small value (~0.2 mm) at the center. The narrowest part of the funnels used here had diameters that were only slightly larger than the diameters of jacketed or unjacketed optical fiber. To thread a fiber 10 into a microcapillary 23A, the fiber and the capillary are inserted into opposite ends of the funnel. The microcapillary reaches a stopping point at the place where its outer diameter (OD) equals the funnel's local inner diameter. The fiber 10, which enters the funnel 50 from the opposite side, is naturally aligned by the funnel, to the center of the bore of the capillary. Pushing the fiber through the funnel, therefore, threads it into the microcapillary quickly and easily. This procedure does not require microscopes or precision alignment stages.

Figure 5B:
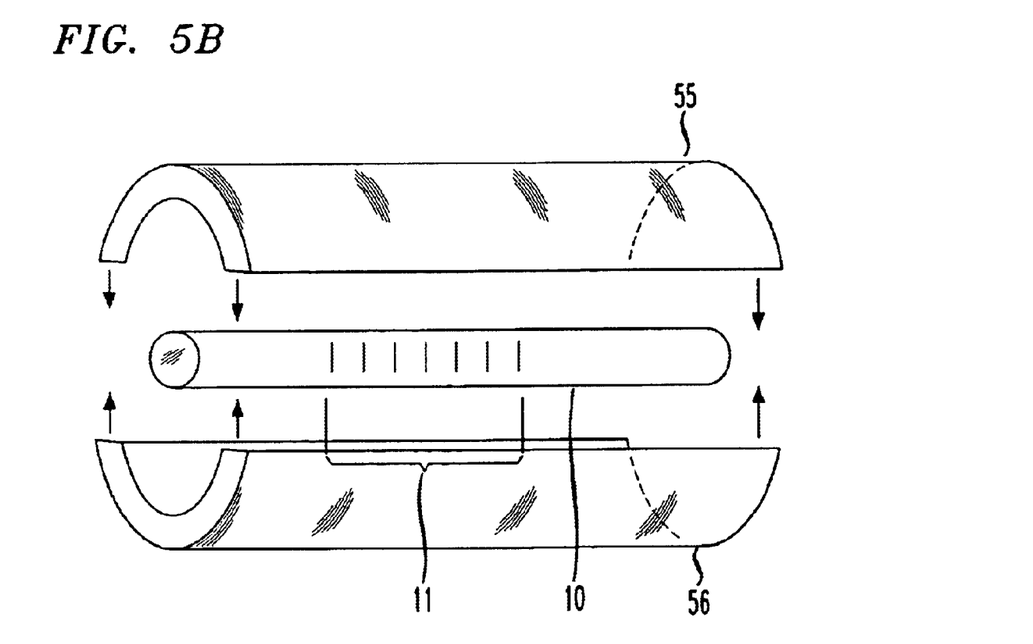
FIG. 5B schematically illustrates a separable microcapillary to facilitate fiber device placement.

FIG. 5B illustrates an alternative approach to facilitate insertion of the fiber into a separable microcapillary. Here the microcapillary is axially split into two parts 55, 56. The two parts are then bonded together around the length of fiber 10 including the device to be heated. After bonding, the heating coatings are applied to the bonded microcapillary.

In all of the devices described here, the region of the fiber that contains the grating does not have a polymer jacket. The jacket was stripped before writing the gratings and the bare fiber was not recoated. With the 140 µm ID microcapillaries, we also stripped the polymer jacket along half of the length of fiber leading up to the grating so that it could be threaded into the capillary. We also used the 280 µm ID microcapillaries which had the advantage that they did not require the jacket to be removed. In both cases, the radial position of the fiber within the capillary was not controlled directly. The fibers contacted the inner walls of the capillaries at various places determined by the way that the fiber happened to rest after the threading procedures and the packaging steps described below.

B. Metal Coatings

Thin metal coatings were deposited onto the microcapillaries and the fibers by electron beam evaporation at base pressures of ~1×10$^{-6}$ torr. The coatings typically consisted of 10 nm Ti (deposition rate ~0.1 nm/s; adhesion promoter) and between 200 and 2000 nm of Au (deposition rate ~0.3–0.6 nm/s). The thickness gradients for the tapered coatings were generated with a moving shadow mask coupled to a computer controlled rotation stage. In most cases, the metal coatings were deposited on only one side of the microcapillaries.

In others, two deposition runs were used to coat both sides. The depositions were made through a slit mask slightly narrower than the microcapillary and aligned with it. The microcapillary was rotated 180° between the two depositions, and the films after deposition were not in contact and were electrically isolated. The optical fibers were coated on one side only.

C. Package and Electrical Connections

Each microcapillary was secured within a quartz tube with a ~5 mm inner diameter. It provided some thermal isolation of the fibers from their surroundings; it also offers mechanical support and protection. The fibers and microcapillaries were bonded, with either silver paint, silver epoxy or indium solder, to two pairs of gold-coated brass ferrules at the ends of these tubes. The optical fiber bonds to the ferrules at the ends of the package. The inner pair of ferrules connect to the microcapillaries. Wires were attached to the two sets of ferrules to facilitate connection to power supplies.

D. Optical and Electrical Testing

The devices were driven by current from DC power supplies. We typically measured by the applied voltages and the currents in order to determine the input power. The reflectivity spectra were measured with a JDS Swept Wavelength System. The group delay characteristics were evaluated with an HP Chromatic Dispersion Tester at high resolution with a modulation frequency of 2 GHz.

E. Results

Figure 6A:
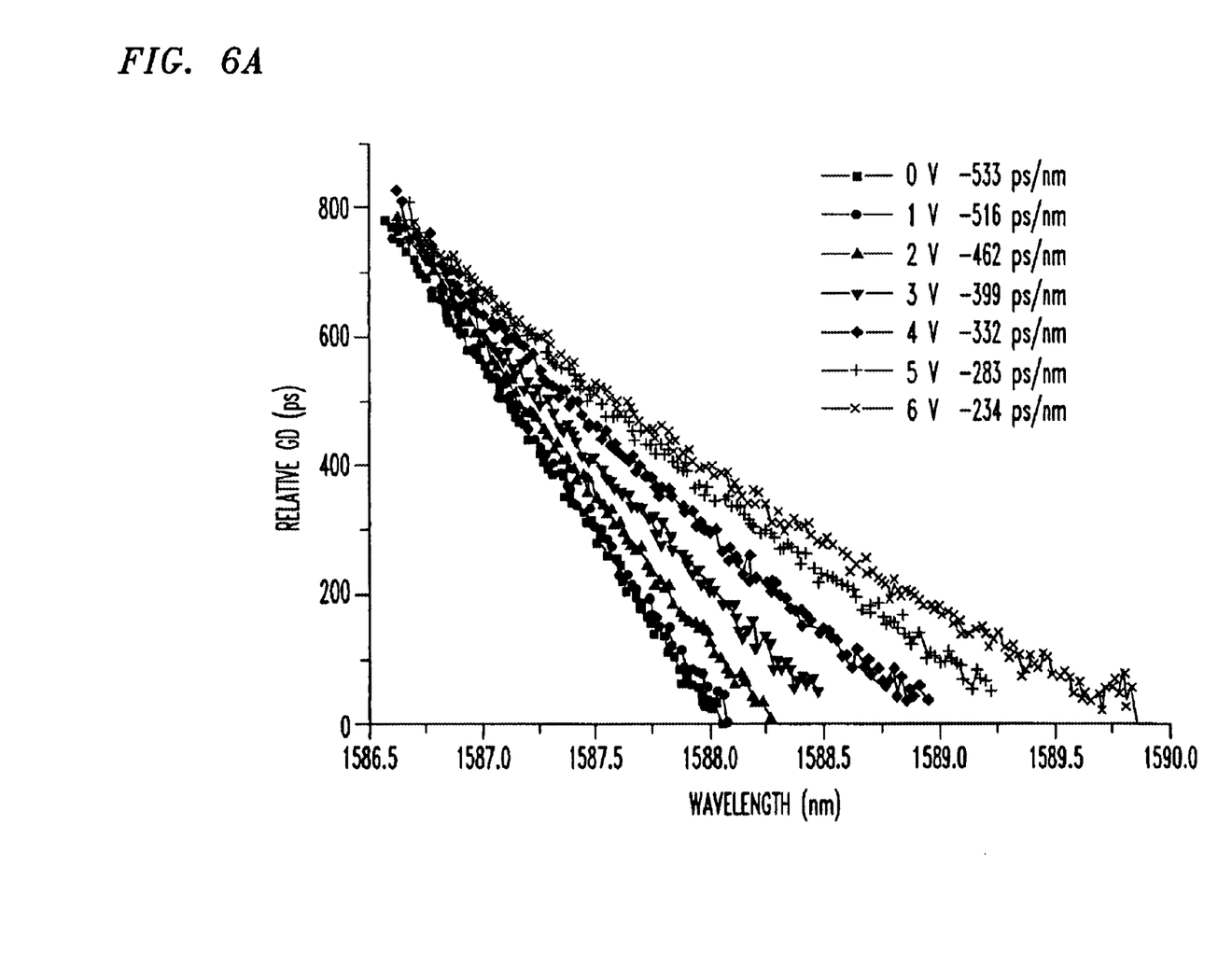
FIGS. 6A and 6B graphically present dispersion from experimental single heater devices of the type shown in FIG. 1.
Figure 6B:
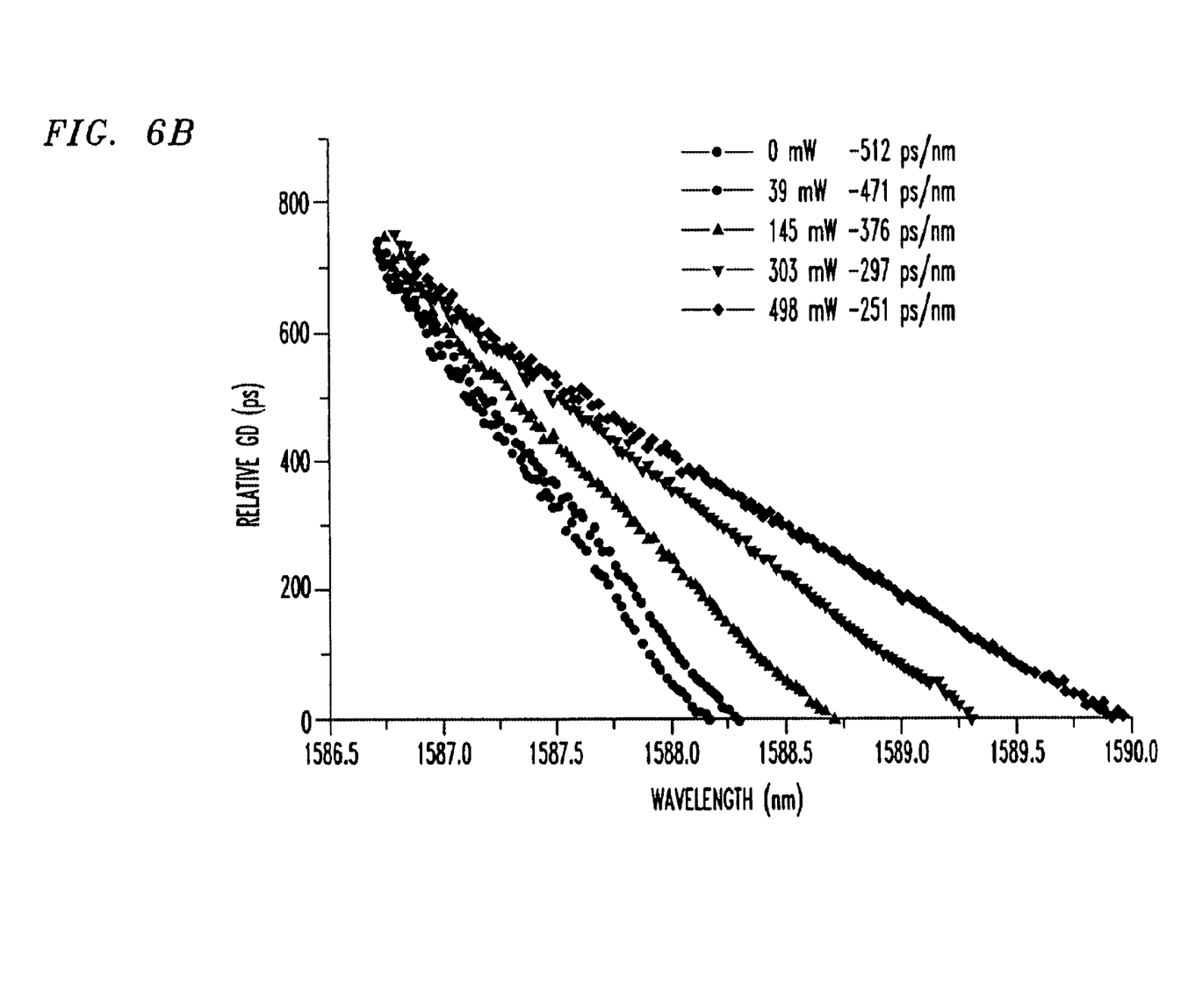

FIG. 6A presents typical dispersion data from a single heater device that uses a tapered metal film heater on the fiber itself (deposited only on one side). FIG. 6B shows similar data from a device that uses a bare fiber threaded into a microcapillary tube (280 µm ID, 357 µm OD) that supports a metal thin film heater (deposited only on one side). The geometries of the metal coatings were the same in both cases: 0.2 to 2.0 µm variation in thickness in a manner that depends inversely on position along the ~10 cm length of the grating. The group delay characteristics (linearity, group delay ripples, etc.) of these two devices are the same, to within experimental uncertainties. The optical characteristics of the microcapillary device are as good as those of previously demonstrated fiber dispersion compensators.

Figure 7:
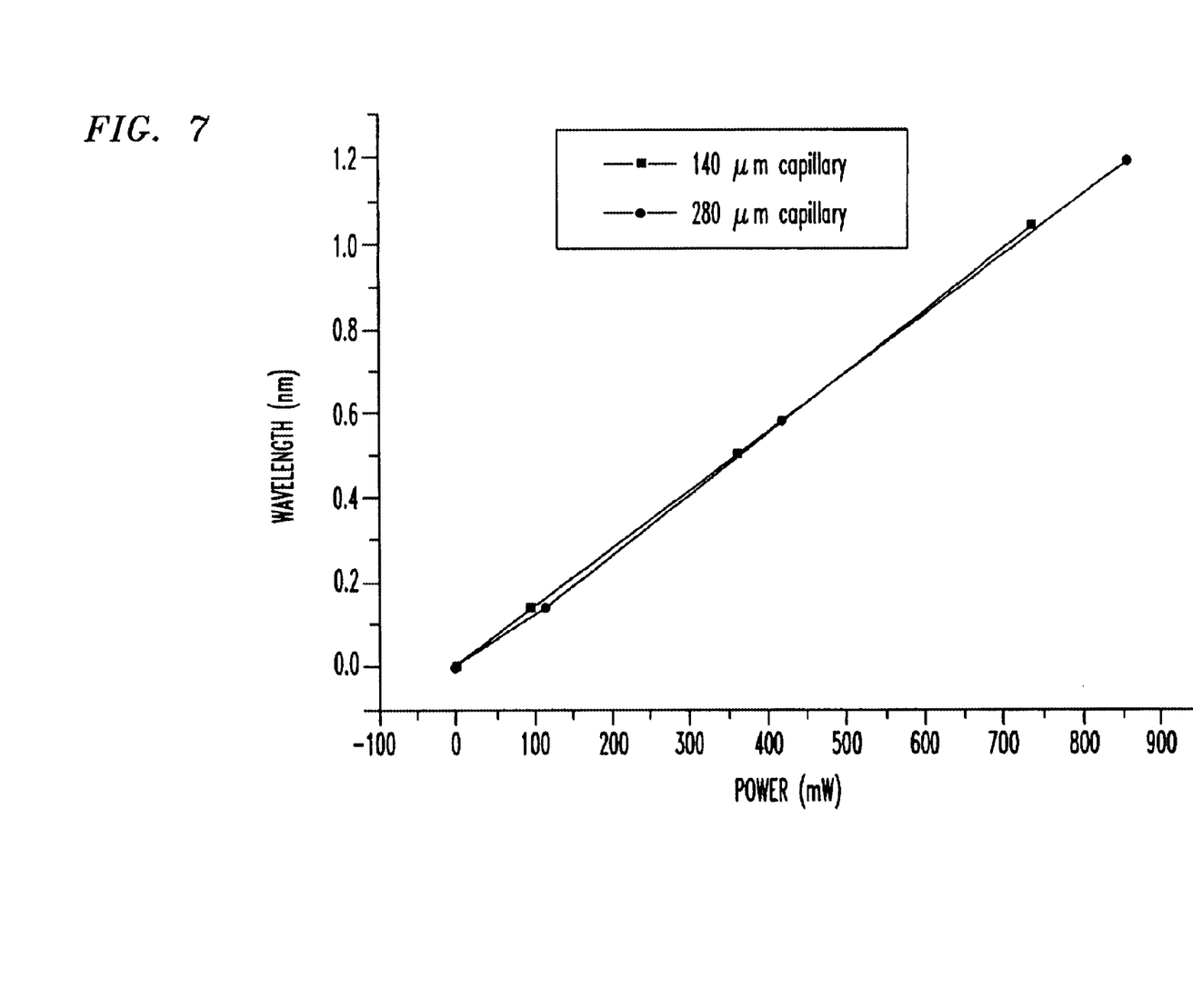
FIG. 7 graphically illustrates wavelength shift as a function of heating power for an experimental single heater device.

To examine the relative power efficiencies, we compared devices with uniform coatings. The optical properties were as expected: shifting without distortions either in the reflection spectra or in the group delay characteristics. FIG. 7 shows typical wavelength shifts as a function in input heating power for devices that use microcapillaries with IDs of 140 and 280 µm and ODs of 360 µm and 357 µm, respectively, and uniform coatings on both sides of the capillaries. We observed that (i) these two devices have the same power efficiencies and (ii) the efficiencies of these devices (~0.00145 nm/mW) are only slightly worse that non-capillary devices that use coatings directly on the fiber (~0.0018 nm/MW). Analysis shows that the nearly identical ODs of these two devices largely explains their similar power efficiencies. It is surprising that these efficiencies are comparable to those of fiber-only devices, particularly because (i) the addition of the capillary tubes increases considerably the thermal mass and (ii) the thermal coupling between the heater and the fiber is less than ideal due to the presence of a small air gap between the capillaries and the fibers.

2. Dual Heater Devices

Figure 8:
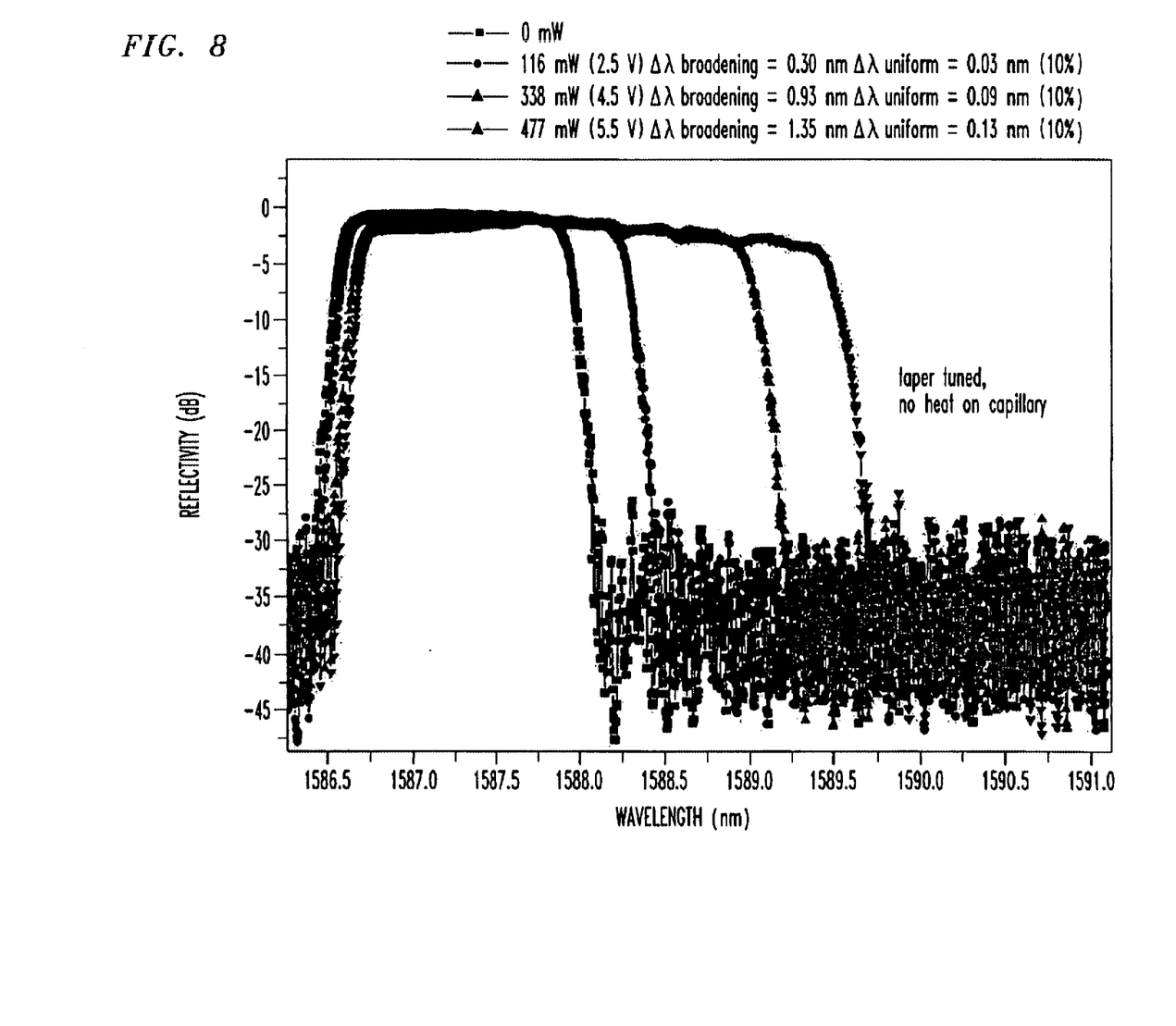
FIG. 8 graphically illustrates reflectivity spectra from experimental dual heater devices of the type shown in FIG. 2.

FIG. 8 shows the reflectivity spectra of a typical dual heater device based on tapered metal coating on a fiber (deposited on only one side) that is threaded into a microcapillary that supports a uniform metal coating (deposited on both sides). These results illustrate the good characteristics of this device: the spectra do not distort when current through the uniform heater is adjusted, and the spectra broaden in the expected way when current flows through the tapered coating.

Figure 9:
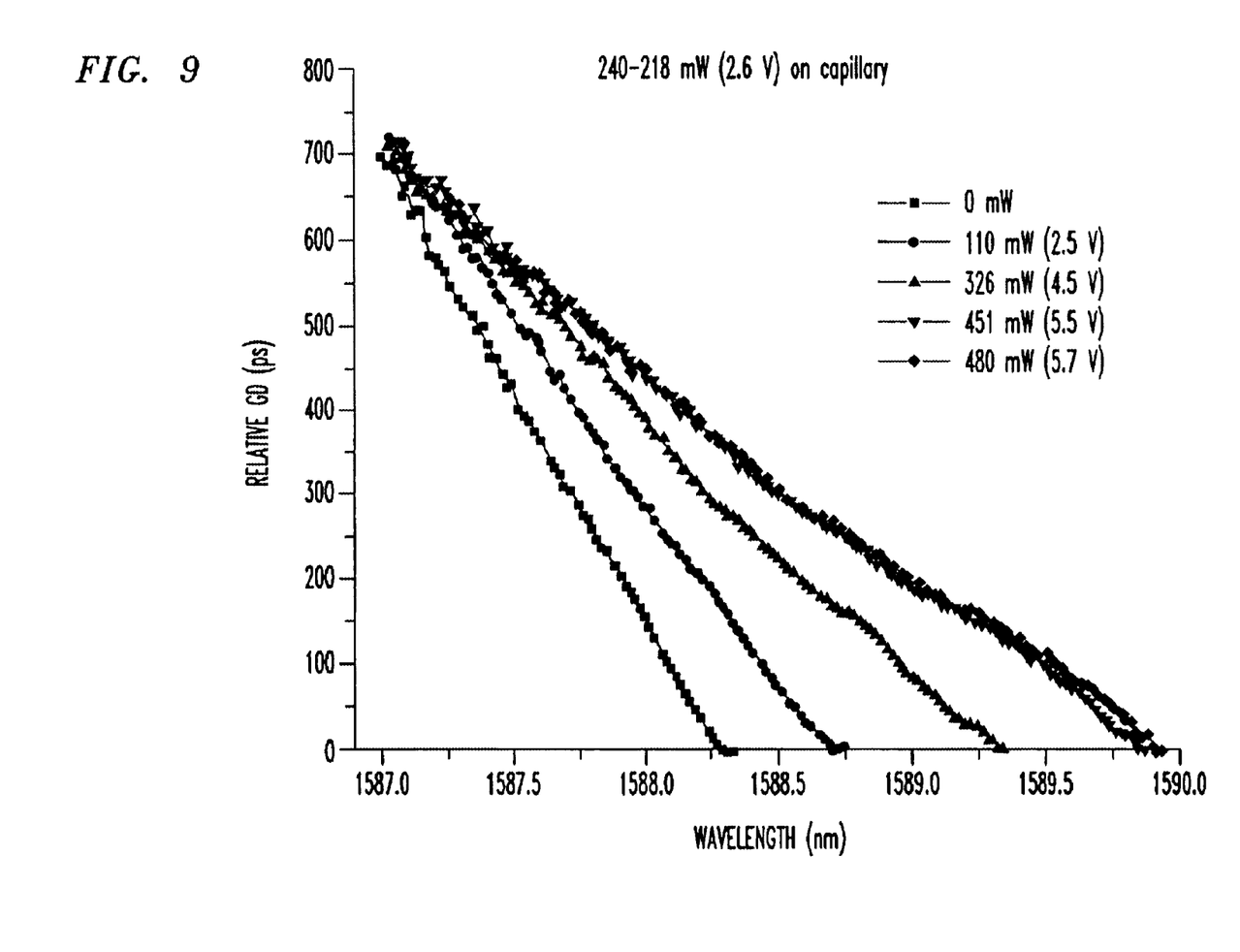
FIG. 9 shows typical group delays from a dual heater device.

FIG. 9 shows typical group delays. The important result is that (except for the long wavelength side of the dispersion when substantial current flows through both heaters at once) the tuning of the group delays induced by flowing current through each of the heaters is uncoupled: flowing current through the uniform heater uniformly shifts the group delay curves without changing their shape, and flowing current through the tapered heater changes the group delay slope and the center position of the reflection band in an expected manner. Similar tests with dual heater microcapillary devices similar to FIG. 4 had results substantially similar to those shown in FIGS. 8 and 9.

Thus microcapillary tubes provide the basis for a new type of design for thermally tuned fiber grating devices. Their use provides a simple, low cost route to achieving multiple heaters that can be controlled independently for flexible tuning of grating properties. They also enable the fabrication of the thin film heaters to be separated from that of the fiber gratings. Devices that use microcapillaries have power efficiencies and optical properties which are all comparable to those of devices that use coatings deposited directly on the fiber surface. The microcapillary-based devices have good optical properties despite the fact that the position of the axis of the fiber within the capillary is not precisely controlled.

The dual heater microcapillary device that we demonstrated offers the ability to adjust the center position of the reflection band to compensate for shifting that can be caused by thermally induced changes in the chirp rate or by changes in the ambient temperature. This type of functionality will be required for single grating based dispersion compensators that have large dispersion tunability.

In these dual heater devices, active stabilization of the grating center wavelength can be achieved by driving the uniform heater with enough current to keep its resistance fixed. To a first approximation, this constant resistance condition ensures that the temperature, averaged along the length of the fiber grating, remains constant. In this approach, the coating serves a dual role as heater and distributed temperature sensor. This type of feedback control is attractive because it does not require a separate calibrated temperature sensor; the intrinsic resistivity of the metal for the heater changes in a linear fashion with temperature (for gold, the resistivity changes by 0.3%/° C.). A drawback of this effect is that temperature gradients produced by flowing current through the tapered heater create resistivity gradients in the uniform coating. As a result, flowing current through this uniform coating when the tapered heater is also in operation produces input power that varies with position in a manner that tends to increase the existing temperature gradient. In this case, the uniform heater no longer provides a simple uniform shifting of the grating spectrum, but it adds to the chirp. This effect is at least partly responsible for the non-ideal behavior exhibited by the measured group delays at long wavelengths when substantial currents flow through both heaters. Nevertheless, for the particular device described here, this behavior does not degrade the optical performance in the wavelength range that is most important (i.e. the short wavelength side of the reflection band). Also, the ability to tune the center position of the reflection band provides additional flexibility for ensuring that the WDM channel sees only the linear part of the group delay.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A thermally tunable optical fiber device comprising:
   a length of optical fiber including the thermally tunable device; and
   circumferentially surrounding the thermally tunable device, a heater for thermally tuning the device, the heater comprising a plurality of nested tubes, each nested tube including an electrically resistive heater.

2. The tunable fiber device of claim 1 wherein the thermally tunable device comprises a fiber grating.

3. A thermally tunable optical fiber device comprising:
   a length of optical fiber including the thermally tunable device; and
   circumferentially surrounding the thermally tunable device, a microcapillary heater for thermally tuning the device, the heater comprising a microcapillary tube having an effective outside diameter of less than about 2 mm and an electrically resistive heater formed on or constituting the tube, wherein the heater comprises a plurality of resistive coatings angularly spaced apart around the periphery of the tube.

4. A thermally tunable optical fiber device comprising:
   a length of optical fiber including the thermally tunable device; and
   circumferentially surrounding the thermally tunable device, a microcapillary heater for thermally tuning the device, the heater comprising a microcapillary tube having an effective outside diameter of less than about 2 mm and an electrically resistive heater formed on or constituting the tube, wherein the tube comprises an electrically resistive material, and the heater comprises the resistive material of the tube.

5. A thermally tunable optical fiber device comprising:
   a length of optical fiber including the thermally tunable device; and
   circumferentially surrounding the thermally tunable device, a microcapillary heater for thermally tuning the device, the heater comprising a microcapillary tube having an effective outside diameter of less than about 2 mm and an electrically resistive heater formed on or constituting the tube, and further comprising an additional heater on the fiber.

* * * * *